(12) United States Patent
Hafla et al.

(10) Patent No.: US 6,651,535 B2
(45) Date of Patent: Nov. 25, 2003

(54) LATHE

(75) Inventors: Dietmar Hafla, Baltmannsweiler (DE);
Anton Haberkern, Wendlingen (DE);
Michael Gaertner, Freiberg a.N. (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 30 days.

(21) Appl. No.: 09/735,403

(22) Filed: Dec. 12, 2000

(65) Prior Publication Data

US 2001/0032532 A1 Oct. 25, 2001

(30) Foreign Application Priority Data

Dec. 13, 1999 (DE) .......................................... 199 59 961

(51) Int. Cl.[7] .............................. B23B 3/00; B23B 2/00
(52) U.S. Cl. ........................................... 82/121; 82/122
(58) Field of Search .......................... 82/121, 122, 124, 82/129

(56) References Cited

U.S. PATENT DOCUMENTS

| | | | | |
|---|---|---|---|---|
| 3,821,835 A | * | 7/1974 | St. Andre et al. ................ 29/36 |
| 4,197,769 A | * | 4/1980 | Smith et al. .................... 82/122 |
| 4,597,155 A | * | 7/1986 | Garnett et al. .................. 29/36 |
| 5,175,914 A | * | 1/1993 | Mitsukuchi et al. ......... 29/27 C |
| 5,182,974 A | * | 2/1993 | Cudini et al. ................. 82/124 |
| 5,293,793 A | * | 3/1994 | Hessbruggen et al. ........ 82/121 |
| 5,644,961 A | * | 7/1997 | Nishio et al. ................ 29/27 R |
| 5,699,598 A | * | 12/1997 | Hessbruggen et al. ...... 29/27 C |
| 6,085,622 A | * | 7/2000 | Link et al. .................... 82/122 |
| 6,102,838 A | * | 8/2000 | Assie .......................... 409/200 |
| 6,161,457 A | * | 12/2000 | Hammer ....................... 82/121 |
| 6,189,427 B1 | * | 2/2001 | Kosho et al. ................. 29/35.5 |
| 6,257,108 B1 | * | 7/2001 | Otake ........................... 82/1.11 |
| 2001/0042424 A1 | * | 11/2001 | Sheehan et al. ............... 82/121 |

FOREIGN PATENT DOCUMENTS

| | | | |
|---|---|---|---|
| DE | 33 37 198 | | 5/1985 |
| DE | 197 53 898 | | 6/1999 |
| GB | 2 178 991 A | * | 2/1987 |
| JP | 01 228 701 | | 9/1989 |

* cited by examiner

*Primary Examiner*—A. L. Wellington
*Assistant Examiner*—Brian D. Walsh
(74) *Attorney, Agent, or Firm*—Barry R. Lipsitz; Douglas M. McAllister

(57) ABSTRACT

In order to so improve a lathe comprising a machine frame, a first workpiece spindle with a vertical first spindle axis and a first workpiece holder, a first carriage system for moving the first workpiece spindle, a second workpiece spindle with a vertical second spindle axis, and a second workpiece holder facing the first workpiece holder, a second carriage system for moving the second workpiece spindle, the first workpiece spindle and the second workpiece spindle being adapted to be brought into a transfer position, that the machine frame can be manufactured in as simple and cost-efficient a manner as possible, it is proposed that the machine frame comprise a first machine bed and a second machine bed constituting an assembly separate from the first machine bed, and that the first carriage system be guided solely on the first machine bed, and the second carriage system be guided solely on the second machine bed.

20 Claims, 9 Drawing Sheets

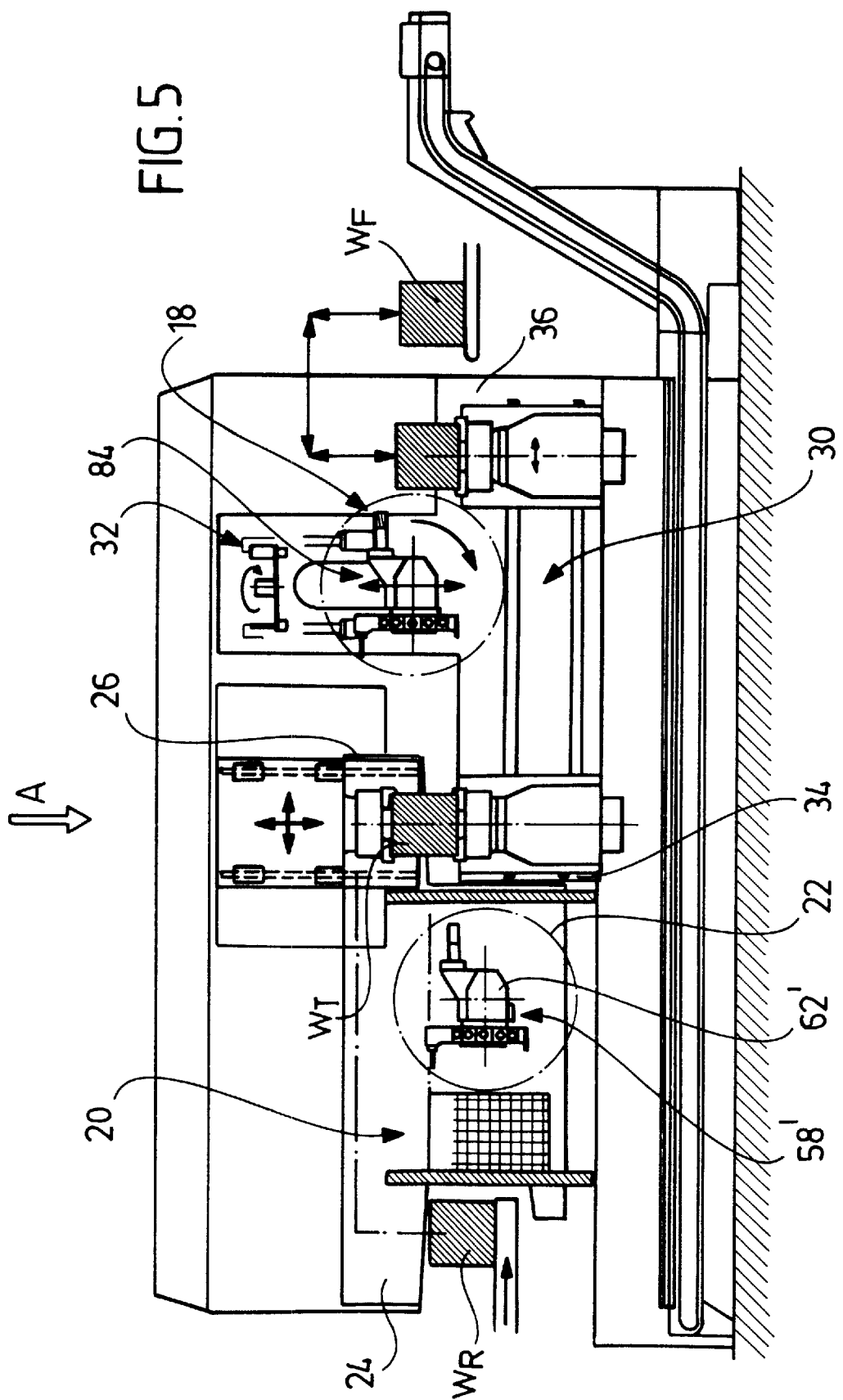

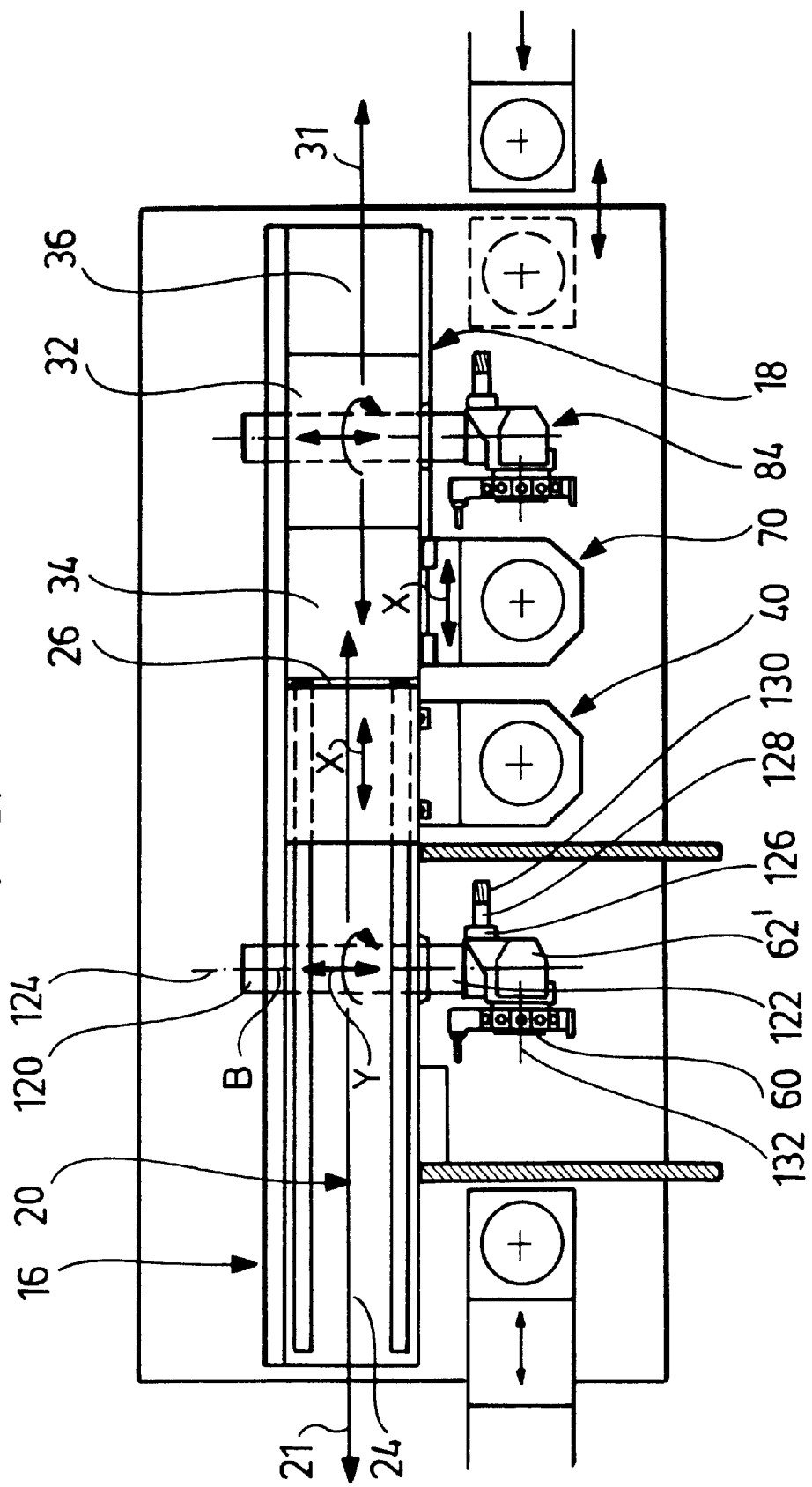

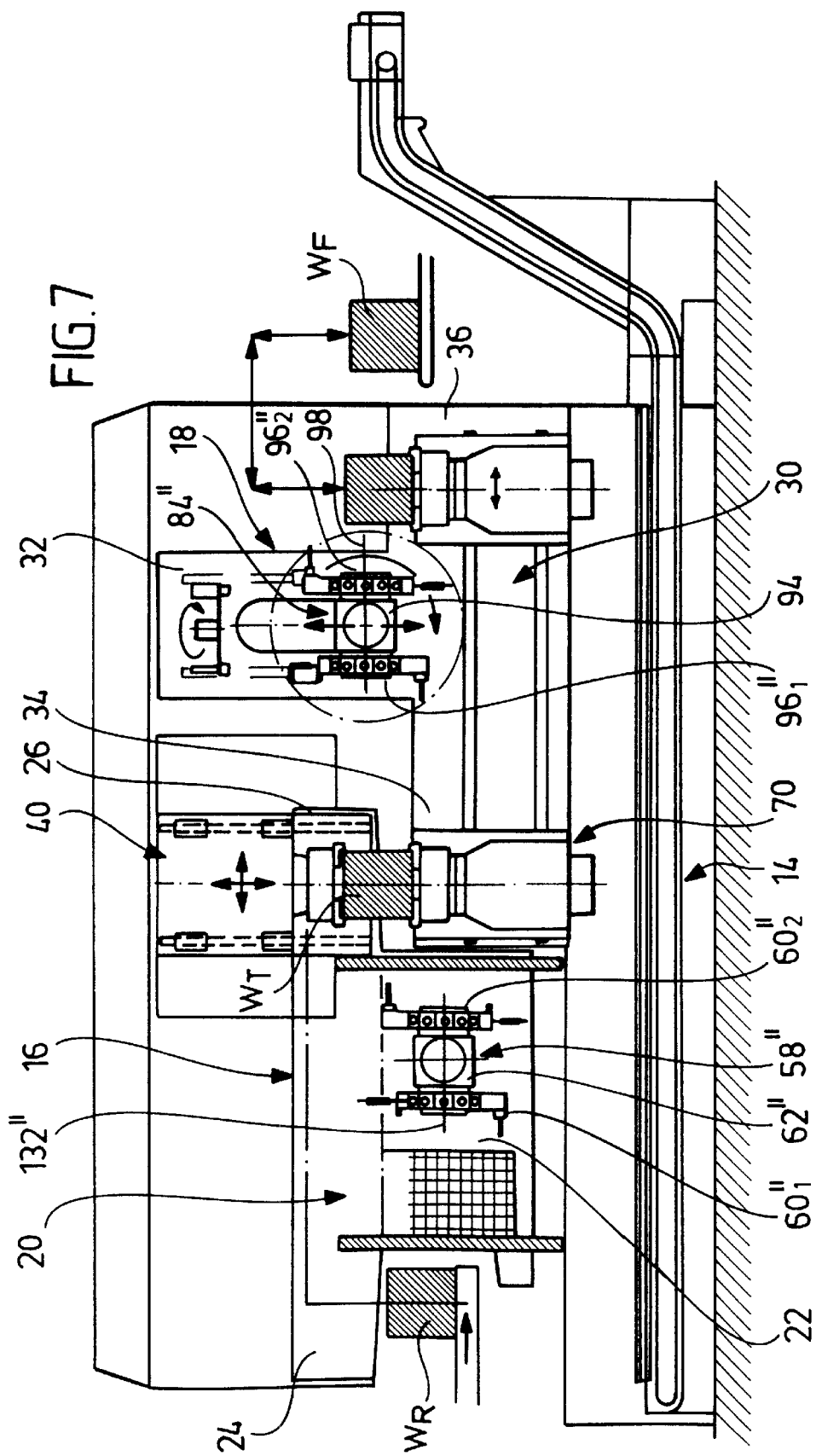

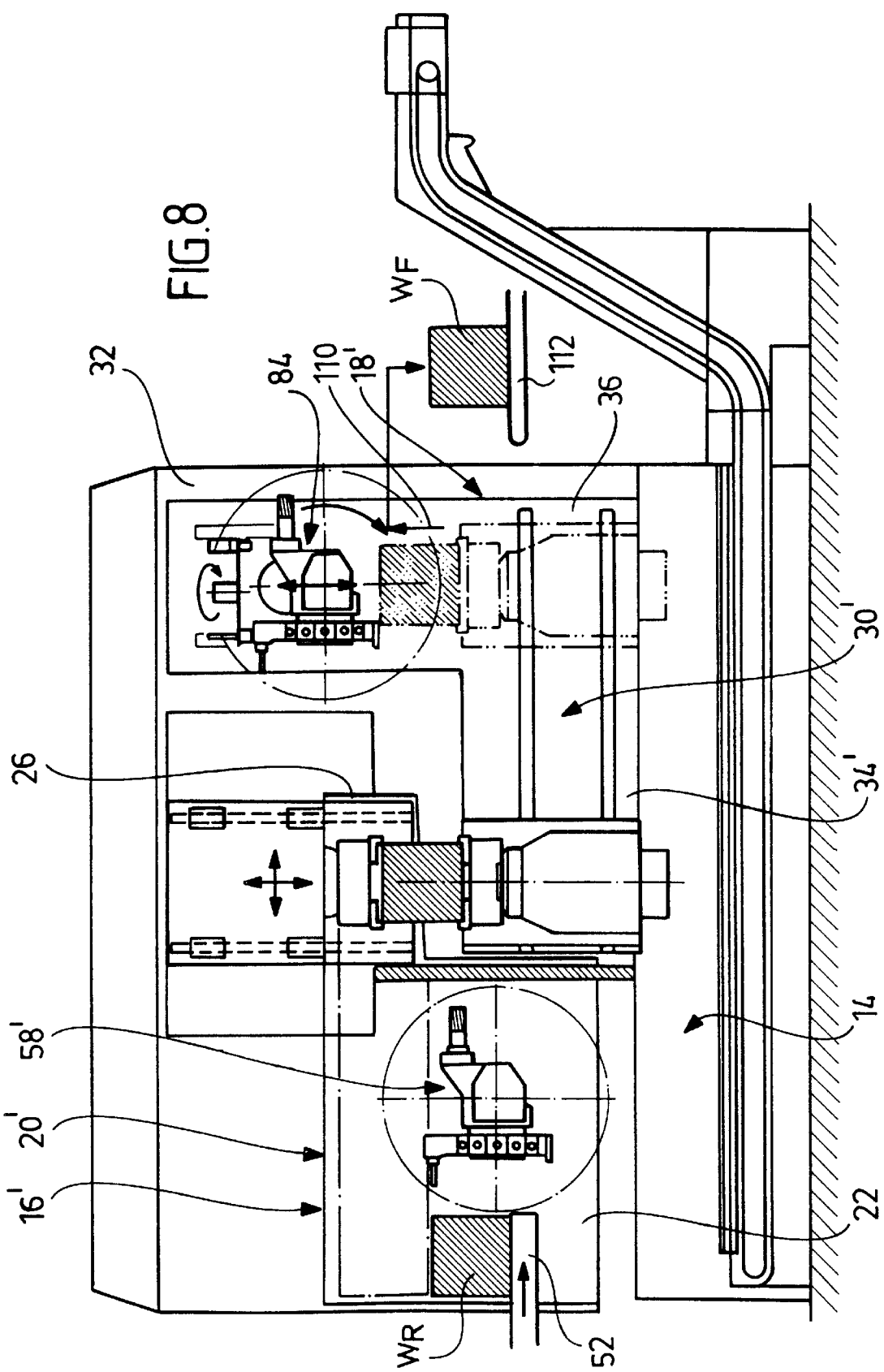

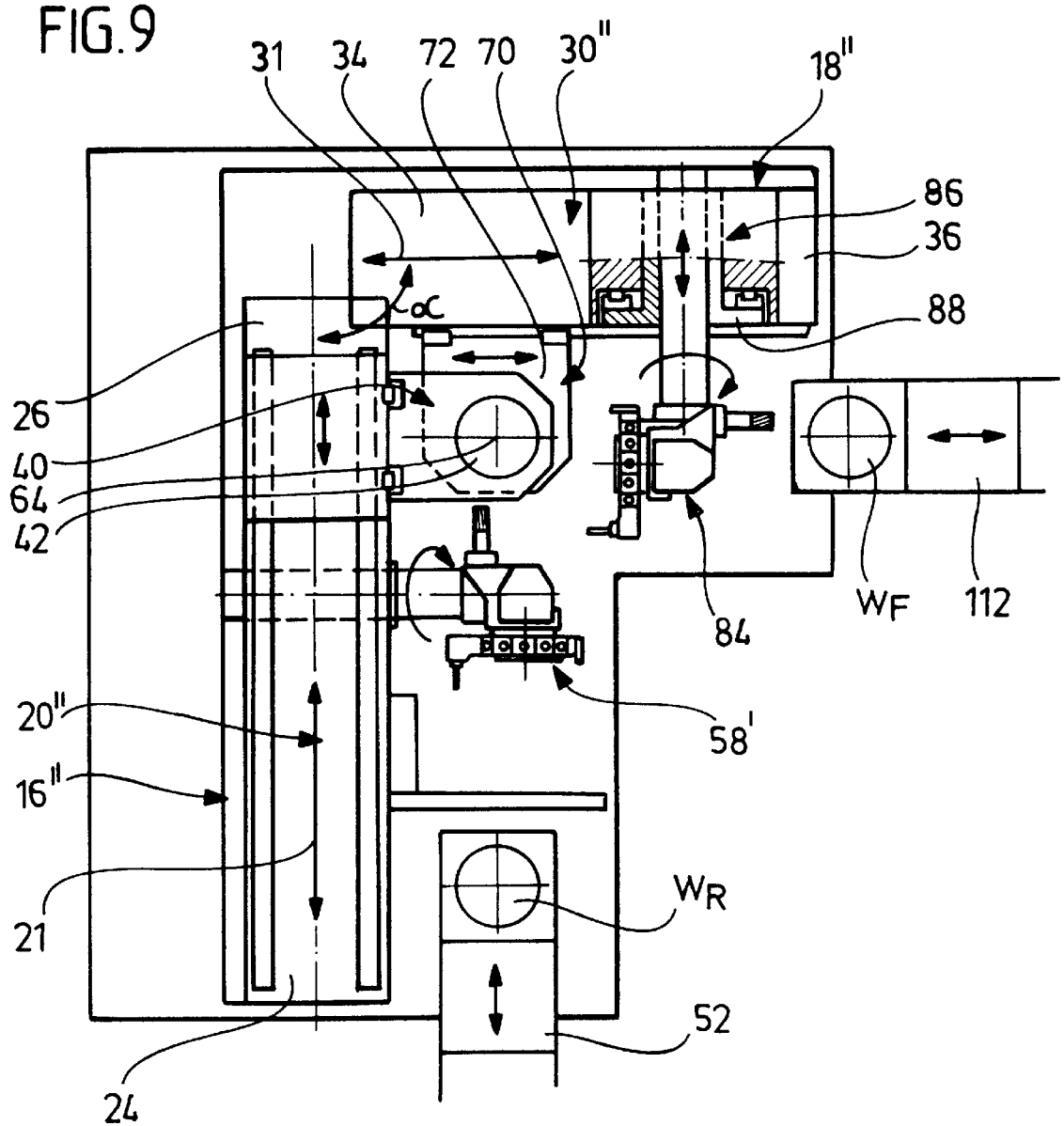

LATHE

Figure 1:
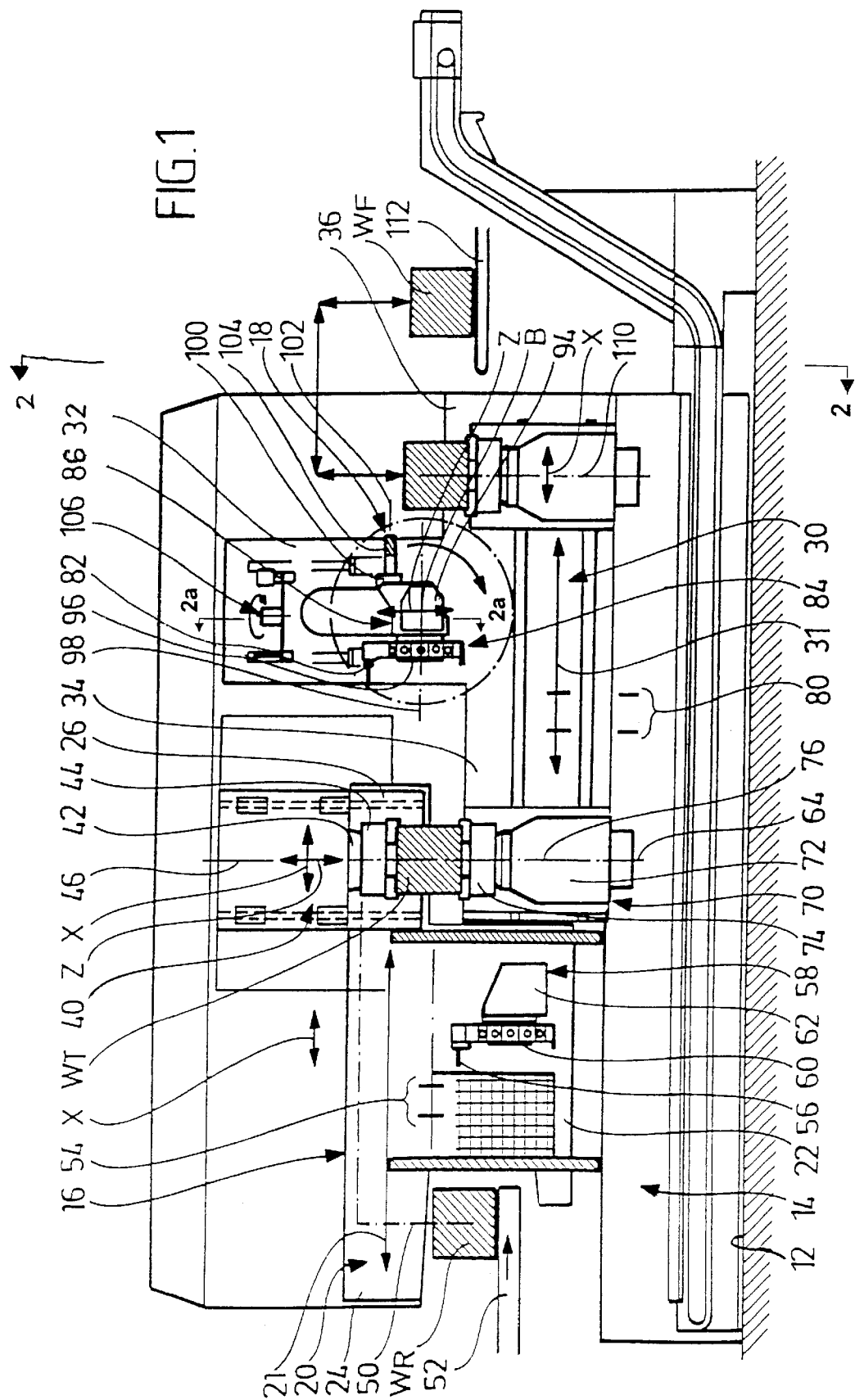

The present disclosure relates to the subject matter disclosed in application No. 199 59 960.0 of Dec. 13, 1999, the entire specification of which is incorporated herein by reference.

The invention relates to a lathe comprising a machine frame, a first workpiece spindle with an approximately vertically aligned first spindle axis and a first workpiece holder, a first carriage system for moving the first workpiece spindle relative to the machine frame transversely to its spindle axis and in the direction of the spindle axis, a first tool carrier for machining a workpiece received in the first workpiece spindle, a second workpiece spindle with an approximately vertically aligned second spindle axis and a second workpiece holder arranged facing the first workpiece holder, a second carriage system for moving the second workpiece spindle relative to the machine frame transversely to its spindle axis, a second tool carrier for machining the workpiece received in the second workpiece spindle, the first workpiece spindle and the second workpiece spindle being adapted to be brought into a transfer position by driving the carriage systems transversely to the respective spindle axes and the workpiece being adapted to be transferred directly from one of the workpiece spindles to the other one of the workpiece spindles in the transfer position.

Such a lathe is known, for example, from DE-A-197 53 898.

However, in such lathes the machine frame is of complicated design.

The object underlying the invention is, therefore, to so improve a lathe of the generic kind that the machine frame can be manufactured in as simple and cost-efficient a way as possible.

This object is accomplished in a lathe of the kind described at the outset, in accordance with the invention, in that the machine frame comprises a first machine bed and a second machine bed constituting an assembly separate from the first machine bed, and in that the first carriage system is guided solely on the first machine bed, and the second carriage system is guided solely on the second machine bed.

The advantage of the solution according to the invention is to be seen in that the lathe according to the invention can be manufactured in the form of two modules, namely, on the one hand, a module comprising the first machine bed with the first carriage system, and, on the other hand, a module comprising the second machine bed with the second carriage system, and, therefore, there is no need, for example, to move a carriage from one module to the other.

This enables considerable rationalization of the manufacture of the lathe according to the invention.

So far, details have not been given of the connection between the first machine bed and the second machine bed. In principle, it is conceivable to set up the first machine bed and the second machine bed alongside each other in the desired alignment and to fix these relative to each other.

It is, for example, conceivable to connect the first machine bed and the second machine bed directly to each other, and this connection can also be a vibration-absorbing connection.

However, in order to make consistent use of the inventive division of the lathe into two modules, and, in particular, also for the question of uncoupling the workpiece spindles during the machining, it is particularly advantageous for the first machine bed and the second machine bed to be arranged in a non-contacting way and free from any direct connection with each other, so that, for example, vibrations and thermal influences between the machine beds are not directly transferred.

A particularly suitable way of setting up the first and second machine beds relative to each other provides for the first and second machine beds to be seated on a common underframe.

Such a common underframe can be used to position the machine beds relative to each other, and it is conceivable to also connect the machine beds to each other or to arrange these so that they are not in contact with each other.

It is, however, particularly advantageous for the first and second machine beds to be positioned relative to each other solely via the underframe.

Details of the design of the machine beds themselves were not given in the above explanation of the individual claims. An advantageous embodiment provides for the first machine bed to comprise a first carriage bed extending transversely to the first spindle axis, with the first carriage system being drivable along the first carriage bed.

Moreover, it is in the same way advantageous for the second machine bed to comprise a second carriage bed extending transversely to the second spindle axis, with the second carriage system being drivable along the second carriage bed.

Many different solutions are conceivable for the alignment of the first machine bed and the second machine bed relative to each other.

For example, it is conceivable to arrange the machine beds relative to each other such that the first carriage guiding direction and the second carriage guiding direction extend parallel to each other.

Alternatively, it is conceivable to arrange the first carriage guiding direction and the second carriage guiding direction such that the carriage guiding directions projected onto a horizontal plane include an angle with each other in this horizontal plane.

This angle may be smaller than 180° and go up to an angle of approximately 90°.

In principle, with such a conception of the machine beds, it would be adequate to arrange these such that the carriage beds come so close to each other that the workpiece spindles arranged on the respective carriage systems can be brought into the transfer position.

It has, however, proven particularly advantageous for the stability and precision of the lathe for the first carriage bed and the second carriage bed to be arranged overlapping each other so that the workpiece spindles do not have to be arranged on the carriage systems such that in the transfer position they are arranged in the direction transverse to the respective spindle axis at the side of the respective carriage bed.

In principle, it is conceivable to arrange the carriage beds so that they overlap each other over considerable partial areas thereof.

A solution which is advantageous as regards sufficiently compact design and uncoupling of the machining operations provides for the carriage beds to be arranged so as to overlap each other with end areas thereof that face each other.

So far, details have not been given of the arrangement of the tool carriers relative to the machine beds. An advantageous embodiment provides for the first machine bed to comprise a tool carrier bed.

This tool carrier bed can be optionally arranged relative to the carriage bed of the first machine bed. An advantageous solution provides for the tool carrier bed to be arranged on a side of the first carriage bed facing a stand area of the machine bed.

It is particularly suitable for the tool carrier bed to form a foot of the first machine bed, and for the foot to carry the first carriage bed.

In the same way, it is expedient for the second machine bed to comprise a tool carrier bed.

It is preferably provided for the tool carrier bed to be arranged on a side of the second carriage bed facing away from a stand area of the second machine bed.

A particularly suitable solution provides for the second carriage bed to carry the tool carrier bed.

Further details of the arrangement of the tool carriers were not given in the above explanation of the individual embodiments. An advantageous embodiment provides for the tool carrier bed to carry a tool carrier arranged stationarily relative to the tool carrier bed, and a tool turret is also to be understood as such a stationary tool carrier.

A further alternative solution for such a stationary tool carrier provides for it to comprise a tool spindle for driven tools.

However, a prerequisite for such a stationary tool carrier is that the workpiece spindle cooperating with it be movable not only transversely to the spindle axis, but also in the direction of the spindle axis so as to be able to expediently carry out the machining of the workpiece.

Alternatively to provision of a stationary tool carrier, it is provided for the tool carrier bed to form a bed for a tool carrier guiding system.

In the simplest case, such a tool carrier guiding system can be designed so as to provide a movability of the tool carrier in the direction of the spindle axis, in particular, when the workpiece spindle is guided by the corresponding carriage system such that it is not movable in the direction of its spindle axis relative to the machine frame.

To enable more complex machinings, in particular, a finishing of workpieces, it is preferably provided for the tool carrier guiding system to provide for a movement of the tool carrier transversely to the spindle axis and also transversely to the carriage guiding direction of the carriage system carrying the workpiece spindle in a direction transverse to the spindle axis.

Such a movability of the tool carrier is usually referred to as Y-axis.

Moreover, it is advantageous for the tool carrier guiding system to provide for a rotation of the tool carrier about an axis extending transversely to the spindle axis, a so-called B-axis. In this case, in particular, complex milling operations can be carried out on the workpiece.

In the lathe according to the invention it is preferably provided for the first workpiece spindle to provide a suspended workpiece holder so that, in particular, with the first workpiece spindle owing to the movability thereof in the direction parallel to the spindle axis by means of the first carriage system, it is possible to receive workpieces in a position provided therefor from a workpiece feed device or to deposit finished workpieces on a workpiece transportation device.

In the same way, the second workpiece spindle is preferably—at least in the simplest case of such a lathe according to the invention—not movable in the direction of its spindle axis, but drivable transversely to the spindle axis into a position in which either a workpiece is removed or a blank workpiece is inserted.

With use of a tool carrier guiding system according to the invention, the tool carrier can be designed in many different ways. One possibility provides for it to comprise a housing on which a rotatable tool turret head is arranged.

Another solution provides for a tool spindle for a rotatingly driven tool to be arranged stationarily on the housing.

It is, however, also conceivable to arrange both a rotatable tool turret head and a tool spindle on the housing.

In this case, the axis of rotation of the tool turret head and the axis about which the tool inserted into the tool spindle rotates are preferably aligned parallel to each other.

An alternative solution thereto provides for a tool turret head to be arranged on each of opposite sides on the housing, with the tool turret heads preferably being rotatable independently of each other.

Further features and advantages of the invention are the subject of the following description and the drawings of an embodiment.

THE DRAWINGS SHOW

Figure 2:
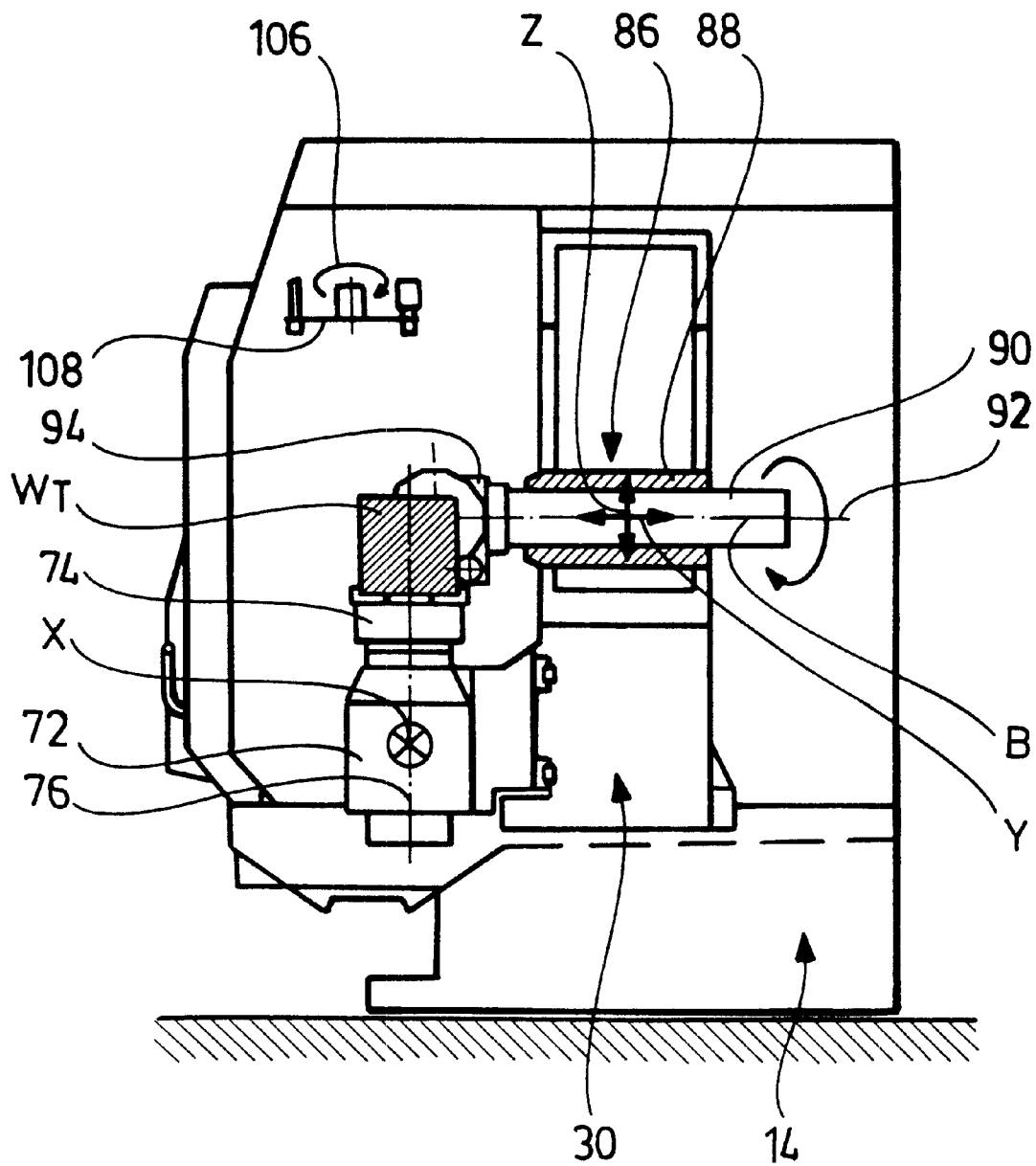
Figure 3:
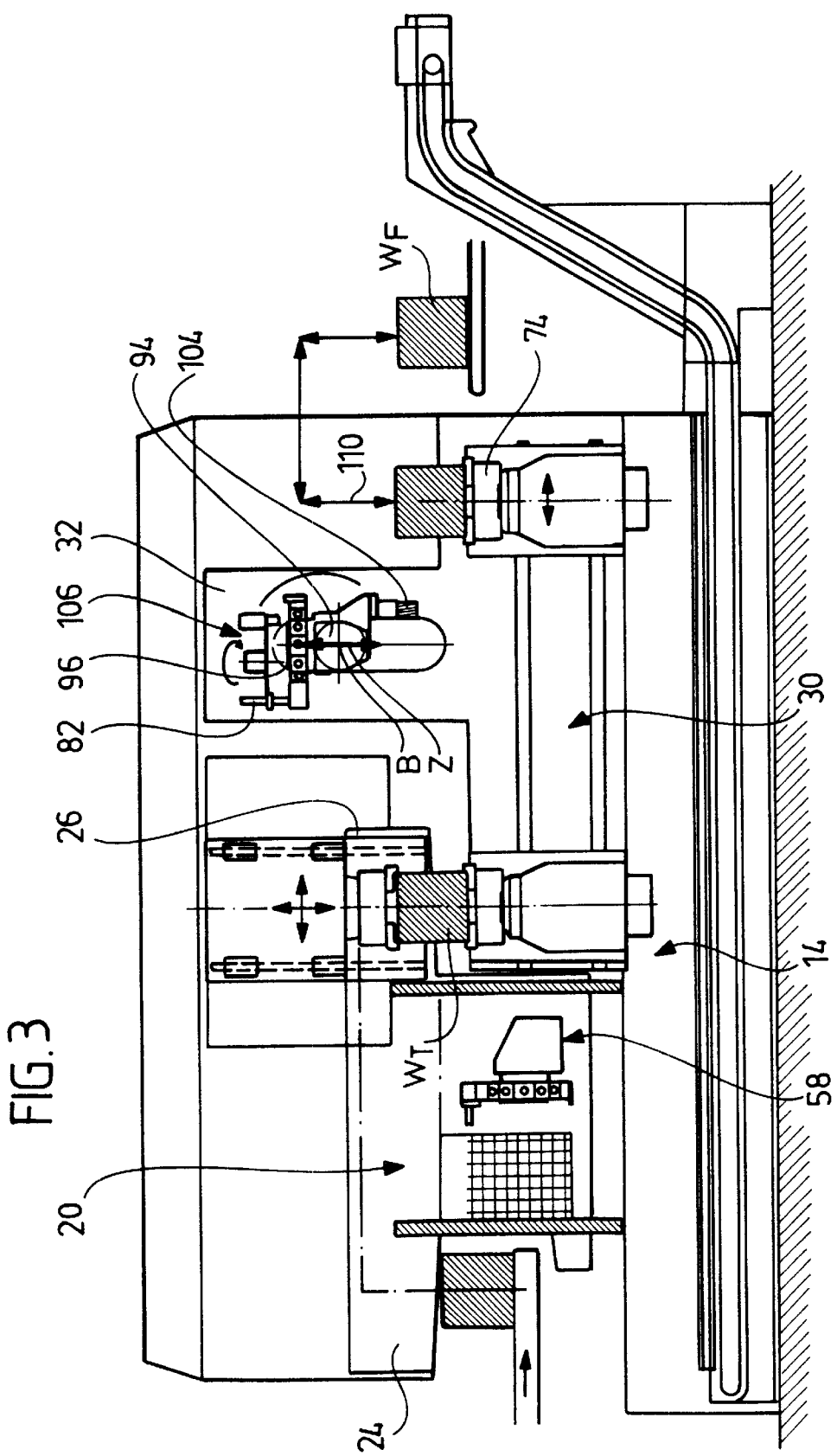
Figure 4:
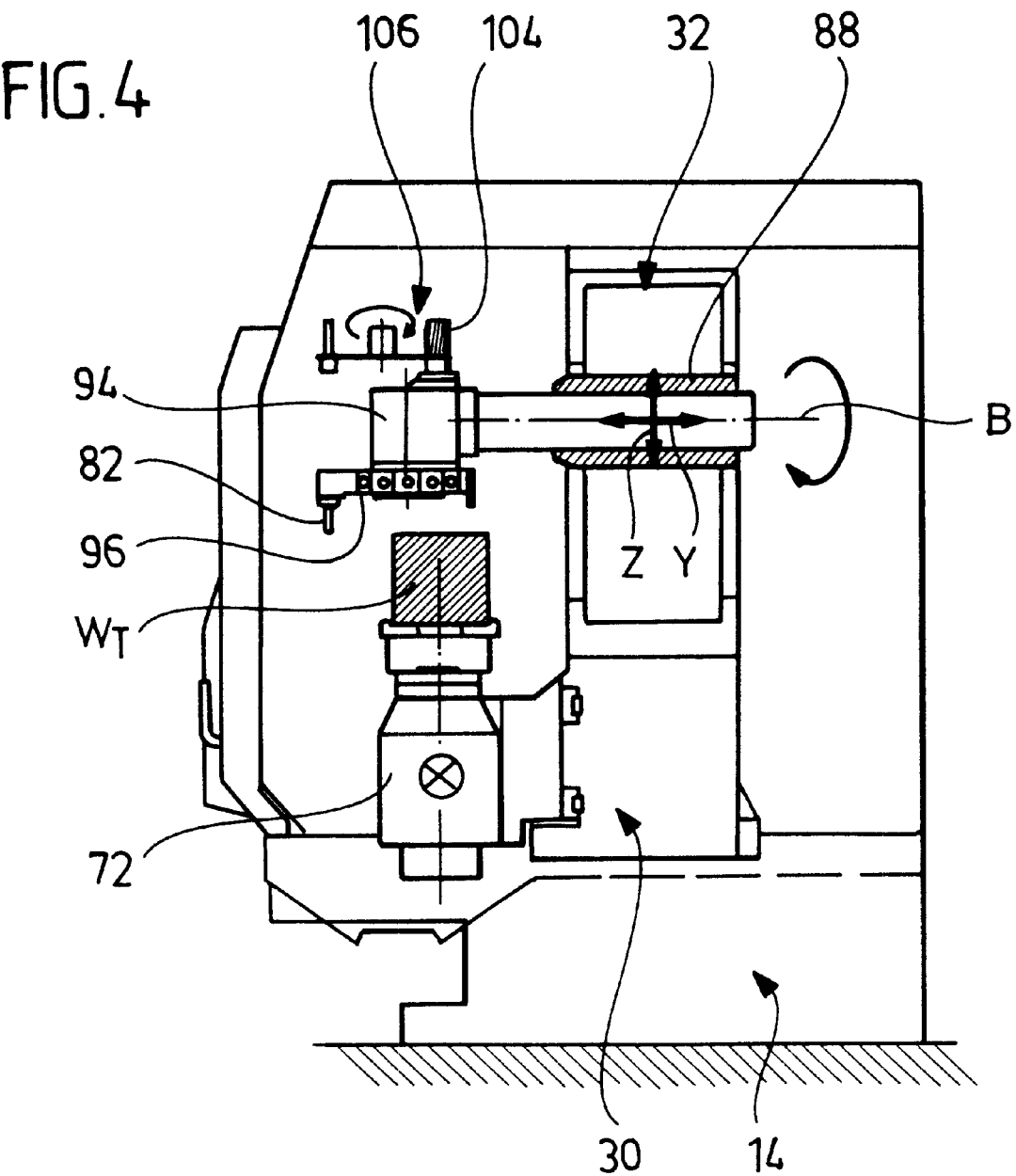

FIG. 1 a front view of a first embodiment of a lathe according to the invention;

FIG. 2 a section along line 2—2 in FIG. 1 with a section of a second tool carrier bed along line 2a—2a in FIG. 1;

FIG. 3 a front view similar to FIG. 1 showing a first possibility for a tool change;

FIG. 4 a view similar to FIG. 2 showing a second possibility for a tool change;

FIG. 5 a front view similar to FIG. 1 of a second embodiment;

FIG. 6 a plan view in the direction of arrow A in FIG. 5 of the second embodiment;

FIG. 7 a front view similar to FIG. 1 of a third embodiment;

FIG. 8 a front view similar to FIG. 1 of a fourth embodiment with machine beds whose shape is changed in comparison with the previous embodiments; and FIG. 9 a plan view of a fifth embodiment of a lathe according to the invention with machine beds arranged at an angle to each other in comparison with the first embodiment.

An embodiment of a lathe according to the invention, shown in FIG. 1, comprises an underframe 14 seated on a stand area 12. The underframe 14 carries a first machine bed 16 and a second machine bed 18, both of which are fixed on the underframe 14 and are thus rigidly connected to one another via the underframe 14, but are not directly supported on one another.

The first machine bed 16 comprises a first carriage bed 20 which extends in a first carriage guiding direction 21 running approximately in a horizontal direction, and a first tool carrier bed 22, with the carriage bed 20 and the tool carrier bed 22 preferably forming an integral part.

The first tool carrier bed 22 expediently forms a foot, which carries the first carriage bed 20 and itself is connected to the underframe 14.

The first carriage bed 20 preferably extends in the carriage guiding direction 21 with cantilever end areas 24 and 26 on both sides beyond the first tool carrier bed 22 lying between these so that the first machine bed 16 is of approximately T-shaped construction.

The second machine bed 18 itself comprises a second carriage bed 30 which extends in a second carriage guiding direction 31 running approximately in a horizontal direction, and a second tool carrier bed 32, with the carriage bed 30 and the tool carrier bed 32 likewise preferably forming an integral part. The second tool carrier bed 32 is arranged on a side of the second carriage bed 30 facing away from the underframe 14 so that the second carriage bed 30 carries the second tool carrier bed 32.

Furthermore, with end areas 34 and 36 projecting on both sides over the second tool carrier bed 32, the second carriage bed 30 preferably extends beyond this tool carrier bed 32 so that the second tool carrier bed 32 lies between the end areas 34 and 36.

The second machine bed 18 preferably rests with the second carriage bed 30 directly on the underframe 14.

A first carriage system 40 is mounted on the first carriage bed 20. The first carriage system 40 carries a first workpiece spindle 42 with a suspended workpiece holder 44, and a first spindle axis 46 of the first workpiece spindle 42 extends essentially at right angles to the stand area 12.

The first carriage system 40 is designed so as to be drivable on the first carriage bed 20 in a numerically controlled manner in an X-direction transversely, preferably at right angles to the first spindle axis 46 between the end area 24 and the end area 26, and, in addition, allows also a numerically controlled movement of the workpiece spindle 42 in a Z-direction parallel to the first spindle axis 46 relative to the first machine bed 16.

In accordance with the invention, the first carriage system 40 is drivable on the first carriage bed 20 such that it stands in the end area 24 of the first carriage bed 20 with the spindle axis 46 in a workpiece receiving position 50 in which the first workpiece spindle 42 is able to grip a blank workpiece $W_R$ by the blank $W_R$ fed on a workpiece feed device 52 being able to be gripped directly with the workpiece holder 44 by driving the first workpiece spindle 42 in Z-direction.

Subsequently, by moving the first workpiece spindle 42 by means of the first carriage system 40, the blank workpiece $W_R$ can be brought with the spindle axis 46 into one or several machining positions 54 in which tools 56 arranged on the tool carrier bed 22 can be employed.

For example, such tools 56 are arranged on a tool carrier 58 and can be brought into a position suitable for machining the blank workpiece $W_R$ by rotating a turret head 60 of the tool carrier 58.

Preferably, a turret housing 62 of the tool turret is stationarily arranged on the tool carrier bed 22 of the first machine bed 16 so that a relative movement takes place between the blank workpiece $W_R$ and the tool 56 merely by numerically controlled movement of the first workpiece spindle 42 in X-direction and Z-direction.

After machining of the blank workpiece $W_R$, it can be brought as partly machined workpiece $W_T$ by driving the first workpiece spindle 42 by means of the first carriage system 40 with the spindle axis 46 into a transfer position 64 in which the first carriage system 40 stands in the end area 26 of the first carriage bed 20.

The first carriage bed 20 is preferably arranged relative to the second carriage bed 30 such that the end area 26 of the first carriage bed 20 overlaps the end area 34 of the second carriage bed 30.

In accordance with the invention, a second carriage system 70 is arranged on the second carriage bed 30. A second workpiece spindle 72 with a workpiece holder 74 and a vertically arranged second spindle axis 76 is drivable relative to the second carriage bed 30, more particularly, between the end area 34 and the end area 36 by means of the second carriage system 70.

Thus, by driving the second carriage system 70 to the end area 34 of the second carriage bed 30, the second workpiece spindle 72 can likewise be brought into the transfer position 64 so that, for example, by moving the first workpiece spindle 42 in Z-direction a direct transfer of the partly machined workpiece $W_T$ from the first workpiece spindle 42 to the second workpiece spindle 72 can take place without transfer or handling devices, and, in particular, the spindle axes are in alignment with one another in the transfer position 64.

By driving the second workpiece spindle 72 from the transfer position 64, the workpiece $W_T$ can be brought into one or several machining positions 80 of the spindle axis 76 in which machining of the workpiece $W_T$ can be carried out with tools 82 of a tool carrier 84.

As shown in FIG. 2, the tool carrier 84 itself is preferably held on a tool carrier carriage system 86 comprising a Z-carriage 88 drivable in a numerically controlled manner in a Z-direction parallel to the spindle axis 76 relative to the tool carrier bed 32, and relative to the Z-carriage 88 a column 90 is displaceable in a numerically controlled manner in a Y-direction at right angles to the spindle axis 76 and preferably at right angles to the X-direction and is rotatable in a numerically controlled manner about its longitudinal axis 92 as B-axis so that, in all, the tool carrier 82 is linearly movable in the direction of a Z-axis and a Y-axis and rotatable about a B-axis relative to the tool carrier bed 32.

For example, the tool carrier 84 is designed so as to comprise a housing 94 on which, on the one hand, a turret head 92 is mounted for rotation about a turret axis 98, and on which, on the other hand, a tool spindle 100 is held, in which tools 104 driven rotatingly about an axis 102 parallel to the turret axis 98 are insertable.

The rotatingly driven tool 104 is preferably a tool which extends away from the housing 94 of the tool carrier 84, and the axis 102 about which the tool 104 is rotatingly driven is offset in parallel relative to the turret axis such that for machining the workpiece $W_T$ in the machining position 80, the tool 104 stands closer to the workpiece $W_T$ than the housing 94 in the direction of the Z-axis.

For exchanging the tools 104 and 82, a tool magazine 106 comprising, for example, a rotatable magazine disk 108 is preferably arranged on a side of the tool carrier 84 opposite the second carriage bed 30.

By driving the entire Z-carriage 88 away from the carriage bed 30 in the direction of the tool magazine 106 it is thus possible to exchange one of the tools 82 of the turret head 96 for another tool from the tool magazine 106, as shown in FIG. 3, or also to exchange the rotatingly driven tool 104 for another tool from the tool magazine 106.

After completion of the machining of the workpiece, the fully machined workpiece $W_F$ is brought by driving the spindle axis of the second carriage system 70 into the end area 36 of the second carriage bed 30 into a workpiece transfer position 110 in which the fully machined workpiece $W_F$ can be removed from the second workpiece spindle 72 and transferred to a workpiece transportation device 112, for example, by a gripper or any conventional type of handling device, not shown in the drawings.

In a second embodiment of a lathe according to the invention, shown in FIGS. 5 and 6, those features which are identical with those of the first embodiment bear the same reference numerals, and, therefore, reference is to be had in full to the statements on the first embodiment for a description of the corresponding parts.

In contrast to the first embodiment, in the second embodiment the tool carrier 58' is not provided with a turret housing 62 stationarily mounted on the tool carrier bed 22, but with a turret housing 62' which is mounted at a front end 122 of a column 120. The column 120 is mounted in the tool carrier bed 22 for displacement in the direction of its longitudinal axis 124 and is drivable and, in addition, rotatable about the longitudinal axis 124.

By a numerically controlled movement in the direction of the longitudinal axis 124, a numerically controlled movement of the turret housing 62' representing a Y-axis is thus possible, and by a numerically controlled rotational movement about the longitudinal axis 124 a numerically controlled movement representing a so-called B-axis is possible.

Furthermore, a tool spindle 126 arranged opposite the turret head 60 is preferably arranged in the turret housing 62'. Insertable into the tool spindle 126 are tools 130 which are rotatingly driven about an axis 128 and extend away from the turret housing 62' in a direction opposite to the turret head 60.

The axis 128 preferably extends parallel to an axis 132, about which the turret head 60 is rotatable, but is offset at a distance therefrom.

In a third embodiment of a lathe according to the invention, shown in FIG. 7, a turret housing 62" of the tool carrier 58" carries on opposite sides a turret head 60₁" and 60₂", respectively, which are both preferably rotatable, but preferably independently of one another, about a common axis 132".

In the same way, the tool carrier 84" is designed such that turret heads 96₁" and 96₂" arranged on opposite sides of the housing 94 are held on the housing 94 likewise rotatably about a common turret axis 98, but preferably rotatably independently of one another.

In other respects, the third embodiment is designed in the same way as the first embodiment. Therefore, like reference numerals are used for like parts and reference is to be had in full to the statements on the first embodiment for a description of these.

In a fourth embodiment of a lathe according to the invention, shown in FIG. 8, the first machine bed 60' is essentially of approximately L-shaped design, i.e., the carriage bed 20 extends solely with its end area 26 beyond the tool carrier bed 22, whereas the carriage bed 20 does not extend beyond the tool carrier bed 22 in the direction of the workpiece feed device 52.

In the same way, the carriage bed 30' is designed so as to extend solely with the end area 34' over the tool carrier bed 32 in the direction of the transfer position and beyond the tool carrier bed 32, whereas the tool carrier bed 32 extends as far as the end area 36 of the carriage bed 30'.

The removal position 110 is thus still arranged within the area of the tool carrier bed 32 so that handling of the fully machined workpiece $W_F$ must take into account the tool carrier 84 and the tool carrier bed 32.

Similarly, the workpiece feed device 52 is to be arranged so as to avoid collision with the tool carrier bed 22.

In other respects, the fourth embodiment is designed in the same way as the first embodiment. Therefore, like parts bear like reference numerals, and reference is to be had in full to the statements on the first embodiment or the second embodiment for explanations of these.

In a fifth embodiment, shown in FIG. 9, the machine beds 16" and 18" are arranged such that when the first carriage guiding direction 21 and the second carriage guiding direction 31 are projected into a horizontal plane, these carriage guiding directions 21 and 31 include with one another an angle α which is smaller than 180°, preferably lying in the range of approximately 90°.

With this constellation, it is not absolutely necessary for the end areas 26 and 34 of the machine beds 16" and 18" to overlap. It is adequate for the workpiece spindle 42 and the workpiece spindle 72 to be arranged in the transfer position 64 such that the spindle axes 46 and 76 are in alignment with each other, and a direct transfer of the partly machined workpiece $W_T$ from the workpiece holder 44 to the workpiece holder 74 is thus possible.

It is, therefore, possible, owing to the angle α between the carriage guiding directions 21 and 31 to construct the lathe according to the invention more compactly.

In other respects, the fifth embodiment according to FIG. 9 is designed in the same way as the first and second embodiments. Therefore, reference is to be had in full to the description of the individual parts thereof in conjunction with the first and second embodiments.

What is claimed is:

1. A lathe, comprising:
   a first workpiece spindle with an approximately vertically aligned first spindle axis;
   a first workpiece holder on said first workpiece spindle;
   a first carriage system for moving the first workpiece spindle relative to a first machine bed transversely to its spindle axis and in the direction of the spindle axis, the first carriage system being guided solely on the first machine bed;
   a first tool carrier for machining a workpiece received in the first workpiece spindle;
   a second workpiece spindle with an approximately vertically aligned second spindle axis;
   a second workpiece holder arranged on a side of said second workpiece spindle facing the first workpiece holder;
   a second carriage system for moving the second workpiece spindle relative to a second machine bed, said second machine bed constituting an assembly separate from the first machine bed and said second carriage system being guided solely on the second machine bed transversely to its spindle axis;
   the first machine bed and the second machine bed being free from any direct connection with each other;
   a second tool carrier for machining the workpiece received in the second workpiece spindle; and
   a transfer position for both workpiece spindles in which the workpiece can be transferred directly from one of the workpiece holders to the other one of the workpiece holders, the first workpiece spindle and the second workpiece spindle being adapted to be brought into the transfer position by driving the carriage systems transversely to the respective spindle axes.

2. A lathe as defined in claim 1, wherein the first machine bed and the second machine bed are seated on a common underframe.

3. A lathe as defined in claim 1, wherein the first machine bed comprises a first carriage bed extending transversely to the first spindle axis in a first carriage guiding direction, the first carriage system being drivable along the first carriage bed.

4. A lathe as defined in claim 3, wherein the second machine bed comprises a second carriage bed extending transversely to the second spindle axis in a second carriage guiding direction, the second carriage system being drivable along the second carriage bed.

5. A lathe as defined in claim 4, wherein the carriage beds are arranged such that the workpiece spindles can be brought into the transfer position by means of the carriage systems.

6. A lathe as defined in claim 1, wherein the first machine bed comprises a tool carrier bed.

7. A lathe as defined in claim 6, wherein the tool carrier bed carries a tool carrier arranged stationarily relative to the tool carrier bed.

8. A lathe as defined in claim 1, wherein the second machine bed comprises a tool carrier bed.

9. A lathe as defined in claim 8, wherein the tool carrier bed forms a bed for a tool carrier guiding system.

10. A lathe as defined in claim 9, wherein the tool carrier guiding system provides for a movability of the tool carrier in the direction of the spindle axis.

11. A lathe as defined in claim 9, wherein the tool carrier guiding system provides for a movement of the tool carrier in a direction (Y) transversely to the spindle axis and also transversely to the movement of the carriage system carrying the workpiece spindle.

12. A lathe as defined in claim 9, wherein the tool carrier guiding system provides for a rotation of the tool carrier about an axis extending transversely to the spindle axis.

13. A lathe comprising:
a first workpiece spindle with an approximately vertically aligned first spindle axis;
a first workpiece holder on said first workpiece spindle;
a first carriage system for moving the first workpiece spindle relative to a first machine bed transversely to its spindle axis and in the direction of the spindle axis, the first carriage system being guided solely on the first machine bed;
a first tool carrier for machining a workpiece received in the first workpiece spindle;
a second workpiece spindle with an approximately vertically aligned second spindle axis;
a second workpiece holder arranged on a side of said second workpiece spindle facing the first workpiece holder;
a second carriage system for moving the second workpiece spindle relative to a second machine bed, said second machine bed constituting an assembly separate from the first machine bed and said second carriage system being guided solely on the second machine bed transversely to its spindle axis;
the first machine bed and the second machine bed being arranged so as not to be in contact with each other;
a second tool carrier for machining the workpiece received in the second workpiece spindle; and
a transfer position for both workpiece spindles in which the workpiece can be transferred directly from one of the workpiece holders to the other one of the workpiece holders, the first workpiece spindle and the second workpiece spindle being adapted to be brought into the transfer position by driving the carriage systems transversely to the respective spindle axes.

14. A lathe comprising:
a first workpiece spindle with an approximately vertically aligned first spindle axis;
a first workpiece holder on said first workpiece spindle;
a first carriage system for moving the first workpiece spindle relative to a first machine bed transversely to its spindle axis and in the direction of the spindle axis, the first carriage system being guided solely on the first machine bed;
a first tool carrier for machining a workpiece received in the first workpiece spindle;
a second workpiece spindle with an approximately vertically aligned second spindle axis;
a second workpiece holder arranged on a side of said second workpiece spindle facing the first workpiece holder;
a second carriage system for moving the second workpiece spindle relative to a second machine bed, said second machine bed constituting an assembly separate from the first machine bed and said second carriage system being guided solely on the second machine bed transversely to its spindle axis;
the first machine bed and the second machine bed being positioned relative to each other solely via a common underframe;
a second tool carrier for machining the workpiece received in the second workpiece spindle; and
a transfer position for both workpiece spindles in which the workpiece can be transferred directly from one of the workpiece holders to the other one of the workpiece holders, the first workpiece spindle and the second workpiece spindle being adapted to be brought into the transfer position by driving the carriage systems transversely to the respective spindle axes.

15. A lathe comprising:
a first workpiece spindle with an approximately vertically aligned first spindle axis;
a first workpiece holder on said first workpiece spindle;
a first carriage system for moving the first workpiece spindle relative to a first machine bed transversely to its spindle axis and in the direction of the spindle axis, the first carriage system being guided solely on the first machine bed;
a first tool carrier for machining a workpiece received in the first workpiece spindle;
a second workpiece spindle with an approximately vertically aligned second spindle axis;
a second workpiece holder arranged on a side of said second workpiece spindle facing the first workpiece holder;
a second carriage system for moving the second workpiece spindle relative to a second machine bed, said second machine bed constituting an assembly separate from the first machine bed and said second carriage system being guided solely on the second machine bed transversely to its spindle axis;
a second tool carrier for machining the workpiece received in the second workpiece spindle; and
a transfer position for both workpiece spindles in which the workpiece can be transferred directly from one of the workpiece holders to the other one of the workpiece holders, the first workpiece spindle and the second workpiece spindle being adapted to be brought into the transfer position by driving the carriage systems transversely to the respective spindle axes;
the first machine bed comprising a first carriage bed extending transversely to the first spindle axis in a first carriage guiding direction, the first carriage system being drivable along the first carriage bed;
the second machine bed comprising a second carriage bed extending transversely to the second spindle axis in a second carriage guiding direction, the second carriage system being drivable along the second carriage bed; and
the first carriage bed and the second carriage bed are arranged so as to overlap each other.

16. A lathe as defined in claim 15, wherein the carriage beds are arranged so as to overlap each other with end areas facing each other.

17. A lathe comprising:

a first workpiece spindle with an approximately vertically aligned first spindle axis;

a first workpiece holder on said first workpiece spindle;

a first carriage system for moving the first workpiece spindle relative to a first machine bed transversely to its spindle axis and in the direction of the spindle axis, the first carriage system being guided solely on the first machine bed;

a first tool carrier for machining a workpiece received in the first workpiece spindle;

a second workpiece spindle with an approximately vertically aligned second spindle axis;

a second workpiece holder arranged on a side of said second workpiece spindle facing the first workpiece holder;

a second carriage system for moving the second workpiece spindle relative to a second machine bed, said second machine bed constituting an assembly separate from the first machine bed and said second carriage system being guided solely on the second machine bed transversely to its spindle axis;

a second tool carrier for machining the workpiece received in the second workpiece spindle; and a transfer position for both workpiece spindles in which the workpiece can be transferred directly from one of the workpiece holders to the other one of the workpiece holders, the first workpiece spindle and the second workpiece spindle being adapted to be brought into the transfer position by driving the carriage systems transversely to the respective spindle axes;

the first machine bed comprising a tool carrier bed arranged on a side of the first carriage bed facing a stand area.

18. A lathe as defined in claim 17, wherein the tool carrier bed forms a foot of the first machine bed, which foot carries the first carriage bed.

19. A lathe comprising:

a first workpiece spindle with an approximately vertically aligned first spindle axis;

a first workpiece holder on said first workpiece spindle;

a first carriage system for moving the first workpiece spindle relative to a first machine bed transversely to its spindle axis and in the direction of the spindle axis, the first carriage system being guided solely on the first machine bed;

a first tool carrier for machining a workpiece received in the first workpiece spindle;

a second workpiece spindle with an approximately vertically aligned second spindle axis;

a second workpiece holder arranged on a side of said second workpiece spindle facing the first workpiece holder;

a second carriage system for moving the second workpiece spindle relative to a second machine bed, said second machine bed constituting an assembly separate from the first machine bed and said second carriage system being guided solely on the second machine bed transversely to its spindle axis;

a second tool carrier for machining the workpiece received in the second workpiece spindle; and a transfer position for both workpiece spindles in which the workpiece can be transferred directly from one of the workpiece holders to the other one of the workpiece holders, the first workpiece spindle and the second workpiece spindle being adapted to be brought into the transfer position by driving the carriage systems transversely to the respective spindle axes;

the second machine bed comprising a tool carrier bed arranged on a side of the second carriage bed facing away from a stand area.

20. A lathe as defined in claim 19, wherein the second carriage bed carries the tool carrier bed.

* * * * *